United States Patent
Wakabayashi et al.

(10) Patent No.: US 6,887,944 B2
(45) Date of Patent: May 3, 2005

(54) MODIFIED POLYPROPYLENE AND PROCESS FOR PRODUCING SAME

(75) Inventors: Hideaki Wakabayashi, Yokohama (JP); Hiroyuki Ozaki, Yokohama (JP); Kunihiko Imanishi, Yokohama (JP); Takeshi Ishihara, Kawagoe (JP); Masatoshi Horii, Saitama (JP); Satoshi Ueki, Tokyo (JP)

(73) Assignee: Tonen Chemical Corporation, Tokyo (JP)

( * ) Notice: Subject to any disclaimer, the term of this patent is extended or adjusted under 35 U.S.C. 154(b) by 0 days.

(21) Appl. No.: 10/608,546

(22) Filed: Jun. 30, 2003

(65) Prior Publication Data

US 2004/0054089 A1 Mar. 18, 2004

(30) Foreign Application Priority Data

Jun. 28, 2002 (JP) ........................................ 2002-191288

(51) Int. Cl.$^7$ ............................................ C08F 255/02
(52) U.S. Cl. ...................... 525/322; 525/275; 525/269; 525/301; 525/309
(58) Field of Search ............................... 525/322, 275, 525/269, 301, 309

(56) References Cited

U.S. PATENT DOCUMENTS 6,703,134 B1 * 3/2004 Parr et al. .................... 428/461

FOREIGN PATENT DOCUMENTS

| EP | 0457291 A2 | 11/1991 |
| EP | 0485983 A1 | 5/1992 |
| JP | 63-264607 | 11/1988 |
| JP | 02-041305 | 2/1990 |
| JP | 04-348114 | 12/1992 |
| JP | 11-100412 | 4/1999 |
| JP | 2001-146565 | 5/2001 |
| WO | WO01/98386 A1 | 12/2001 |

OTHER PUBLICATIONS

Derwent Database XP–002251062 Abstract. (see search report).
Derwent Database XP 002251063 Abstract (see search report).
Veghini et al; "Mechanisms of Stereocontrol for Doubly Silylene–Bridged . . . "; 1999 J. Am. Chem Soc. 121, pp 564–573.
Mori et al; "Thermal Stability of syndiotactic polypropene"; Macromol. Rapid Commun. (1997) 18, pp 157–161.
Doi et al; "Stereochemical Structure and Molecular Weight Distribution . . . Systems"; Makromol. Chem. (1979) 180, pp 57–64.
European Search Report dated Aug. 22, 2003.

* cited by examiner

Primary Examiner—James J. Seidleck
Assistant Examiner—Olga Asinovsky
(74) Attorney, Agent, or Firm—Armstrong, Kratz, Quintos, Hanson & Brooks, LLP

(57) ABSTRACT

A modified polypropylene which is a polypropylene having a value of racemic diad fraction [r] in a specific range and modified with a specific compound, e.g., (meth)acrylic acids, and their derivatives or styrene derivatives to have well-balanced properties of affinity for polypropylene-based materials, thermal stability, and high solubility in organic solvents; and a process for producing same. More particularly, the modified polypropylene which is a polypropylene having a value of racemic diad fraction [r] of 0.51 to 0.88, determined by $^{13}$C-NMR analysis, and chemically modified with a compound serving as a modifier, e.g., (meth)acrylic acids, and their derivatives or styrene derivatives; and the process for producing the modified polypropylene, wherein the polypropylene having a value of racemic diad fraction [r] in the above range is reacted with at least one type of the compound serving as the modifier in the presence of a radical initiator.

4 Claims, No Drawings

MODIFIED POLYPROPYLENE AND PROCESS FOR PRODUCING SAME

BACKGROUND OF THE INVENTION

1. Field of the Invention

The present invention relates to a modified polypropylene and process for producing same. More particularly, this invention is concerned with a modified polypropylene which is a polypropylene having a value of racemic diad fraction [r] in a specific range and modified with a specific compound, e.g., (meth)acrylic acids, and their derivatives or styrene derivatives, and process for producing same. These polymers enable to improve three properties such as, solubility in organic solvents, affinity for polypropylene-based materials and thermal stability, well in the balance.

2. Description of the Prior Art

Conventional polyolefins, e.g., polypropylene and polyethylene, show little affinity for other polymers, e.g., styrene, acrylic and vinyl acetate resins, because of their high crystallinity and non-polar characteristics, causing difficulties in blending polyolefins with other polar materials, coating and adhesion, and printing polar materials on polyolefin-based materials. These are problems for conventional polyolefins.

Development of modified polypropylenes having good balance in the three properties of solubility in solvents, affinity for polypropylene-based materials and thermal stability is needed to solve the above problems.

Polymers of highly crystalline polypropylene incorporated with a functional group, e.g., chlorine or maleic anhydride, have been developed. However, these polymers with a functional group, in general, are insufficiently soluble in solvents, causing problems of difficulty in handling.

Therefore, the base polymers, e.g., low-molecular-weight isotactic polypropylene and copolymer of propylene with another α-olefin, have been studied to improve their solubility.

As the above base polymers, for example, Japanese Patent Laid-open Publication No.11-100412 proposes an isotactic polypropylene having narrow molecular weight distribution and high stereoregularity, so that the polymer has a very high stiffness and heat resistance. Japanese Patent Laid-open Publication No.2001-146565 proposes a resin composition containing a non-crystalline polyolefin (atactic polypropylene or propylene-α-olefin copolymer) grafted with a radical, polymerizable, unsaturated compound. This compound may have a functional group.

However, an isotactic polypropylene of high stereoregularity, e.g., that disclosed by Japanese Patent Laid-open Publication No.11-100412, has generally insufficient solubility in solvents, even if its molecular weight is low. According to Japanese Patent Laid-open Publication No.2001-146565, the resin composition has excellent solubility, inter-layer adhesion to top coat and weather resistance. However, it still fails to show satisfactory characteristics, because it is low in thermal stability and solubility in solvents when the polyolefin is an isotactic polypropylene, and not sufficient in affinity for polypropylene materials when the polyolefin is a propylene-α-olefin copolymer.

Japanese Patent Laid-open Publication No.2-41305 proposes a highly crystalline, syndiotactic polypropylene. The main chain structure of the polypropylene is mainly (80% or more, in particular 95% or more) composed of racemic diad(s). Japanese Patent Laid-open Publication No.4-348114 proposes modification of syndiotactic polypropylene. However, the polypropylene is not sufficiently soluble in solvents at room temperature, resulting from use of highly crystalline syndiotactic polypropylene.

It is discussed, e.g., by "Macromol. Rapid. Commun.," H. Mori et al., 18, 157 to 161 (1997), that syndiotactic polypropylene has higher thermal stability than isotactic polypropylene. Moreover, Japanese Patent Laid-open Publication No.4-348114 also discusses that syndiotactic polypropylene has higher thermal stability than isotactic polypropylene, because the former shows a smaller molecular weight decrease during the modification process.

SUMMARY OF THE INVENTION

It is an object of the present invention to provide a modified polypropylene able to improve properties such as, solubility in organic solvents, affinity for polypropylene-based materials and thermal stability, in a well balanced manner. These polymers are realized by reacting a polypropylene having a value of racemic diad fraction [r] in a specific range and modified with a specific compound, e.g., (meth)acrylic acids, and their derivatives or styrene derivatives (hereinafter sometimes referred to as modifier), to incorporate a variety of functional groups into the polypropylene structure, in consideration of the above situations. It is another object of the present invention to provide a process for producing same.

The inventors of the present invention have found, after having extensively studied to solve the above problems while having noted the main chain structure of polypropylene, that a modified polypropylene well-balanced among the properties of solubility in organic solvents, affinity for polypropylene-based materials and thermal stability can be obtained by modifying a specific polypropylene, and achieving the present invention. This polypropylene having a value of racemic diad fraction [r] of 0.51 to 0.88 is modified with a specific compound, e.g., (meth)acrylic acids, and their derivatives or styrene derivatives in the presence of a radical initiator to introduce a functional group(s) at a specific content, where a value of racemic diad fraction is an index representing syndiotactic extent of a polymer.

The first aspect of the present invention provides a modified polypropylene which is a polypropylene having a value of racemic diad fraction [r] of 0.51 to 0.88, determined by $^{13}$C-NMR analysis, and weight-average molecular weight (Mw) of 5,000 to 400,000, and grafted with units represented by the general formula (1):

General formula (1)

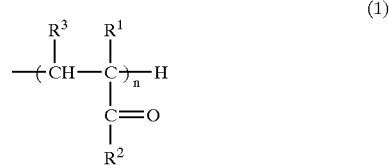

(wherein, $R^1$ is H or an alkyl group of 1 to 10 carbon atoms; $R^2$ is $OR^4$, or a halogen selected from the group consisting of Cl, Br, F and I, or $N(R^1)_2$ or $R^5$—$N(R^1)_2$ group; $R^3$ is H or —$COR^2$ group;

$R^4$ is H or an alkyl group of 1 to 10 carbon atoms, which can have a halogen; aromatic group, which can have an alkyl substituent; —$(CH_2)_a$—O—P(O)($OR^1)_2$ or —$(CH_2)_a$—O—

P(O)(O⁻)(O—(CH₂)$_b$—N⁺R¹₃) ("a" and "b" are each an integer of 1 to 5); alkali metal M selected from the group consisting of Li, Na and K; alicyclic hydrocarbon of 5 to 10 carbon atoms; glycidyl group; R⁵—COCR¹═CH₂; R⁵OR¹; R⁵Si(OR¹)₃ or R⁵—NCO; R⁵ is an alkylene group of 1 to 10 carbon atoms or —[(CH₂)q-O—]r-("q" and "r" are each an integer of 1 to 5); and "n" is 1 to 500, wherein totaled number is 2 to 500, when there are 2 or more units represented by the general formula (1) in one polypropylene molecule).

The second aspect of the present invention provides a modified polypropylene which is a polypropylene having a value of racemic diad fraction [r] of 0.51 to 0.88, determined by ¹³C-NMR analysis, and weight-average molecular weight (Mw) of 5,000 to 400,000, and grafted with units represented by the general formula (2):

General formula (2)

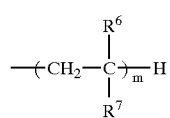

(2)

(wherein, R⁶ is H, an alkyl group of 1 to 10 carbon atoms or halogen selected from the group consisting of Cl, Br, F and I; R⁷ is Ar—X', OCO—R⁶, CHO, COR⁶, CN, pyridyl group, pyrrolidonyl group, Si(OR¹)₃, a halogenated alkyl of 1 to 10 carbon atoms, halogen, OR⁶, OSO₃M or NH—CO—R⁶;

X' is R⁶, OH, COOH, NH₂, CN, NO₂, a halogenated alkyl of 1 to 10 carbon atoms, CH═CH₂ or OCO—R⁶; R¹ is H or an alkyl group of 1 to 10 carbon atoms; M is the alkali metal described above; and "m" is 1 to 500, wherein totaled number is 2 to 500, when there are 2 or more units represented by the general formula (2) in one polypropylene molecule).

The third aspect of the present invention provides a process for producing a modified polypropylene, wherein the polypropylene for the first aspect, produced by polymerization in the presence of a homogeneous metallic complex catalyst to have a value of racemic diad fraction [r] of 0.51 to 0.88, determined by ¹³C-NMR analysis, and weight-average molecular weight (Mw) of 5,000 to 400,000, is reacted with at least one type of the compound represented by the general formula (3) in the presence of a radical initiator:

General formula (3)

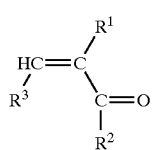

(3)

(wherein, R¹, R² and R³ are the same as the corresponding ones described above).

The fourth aspect of the present invention provides a process for producing a modified polypropylene, wherein the polypropylene for the second aspect, produced by polymerization in the presence of a homogeneous metallic complex catalyst to have a value of racemic diad fraction [r] of 0.51 to 0.88, determined by ¹³C-NMR analysis, and weight-average molecular weight (Mw) of 5,000 to 400,000, is reacted with at least one type of the compound represented by the general formula (4) in the presence of a radical initiator:

General formula (4)

(4)

(wherein, R⁶ and R⁷ are the same as the corresponding ones described above).

The preferred embodiments of the present invention include:
1) the modified polypropylene of the first aspect, wherein "n" in the general formula (1) is 1 to 300,
2) the modified polypropylene of the first aspect, wherein the units represented by the general formula (1) are derived from (meth)acrylic acid, or an alkyl or glycidyl ester thereof,
3) the modified polypropylene of the first aspect, wherein the units represented by the general formula (1) are derived from an alkali metal salt or halide of (meth)acrylic acid,
4) the modified polypropylene of the first aspect, wherein the units represented by the general formula (1) are derived from a (meth)acrylic acid derivative containing OH, alkoxy, amino or isocyanate group,
5) the modified polypropylene of the second aspect, wherein "m" in the general formula (2) is 1 to 300,
6) the modified polypropylene of the second aspect, wherein the units represented by the general formula (2) are derived from a styrene derivative,
7) the modified polypropylene of the second aspect, wherein the units represented by the general formula (2) are derived from a vinyl compound or unsaturated dicarboxylic acid,
8) the modified polypropylene of the first or second aspect, wherein the polypropylene has a weight-average molecular weight (Mw) of 10,000 to 250,000, and the process of the third or fourth aspect for producing a modified polypropylene, wherein the polypropylene has a weight-average molecular weight (Mw) of 10,000 to 250,000,
9) the modified polypropylene of the first or second aspect, wherein the polypropylene has a molecular weight distribution (Mw/Mn) of 1.01 to 3.00, and the process of the third or fourth aspect for producing a modified polypropylene, wherein the polypropylene has a molecular weight distribution (Mw/Mn) of 1.01 to 3.00,
10) the modified polypropylene of the first or second aspect, wherein the polypropylene has a value of racemic diad fraction [r] of 0.55 to 0.84, and the process of the third or fourth aspect for producing a modified polypropylene, wherein the polypropylene has a value of racemic diad fraction [r] of 0.55 to 0.84,
11) the process of the third aspect for producing a modified polypropylene, wherein the compound represented by the general formula (3) is (meth)acrylic acid, or an alkyl or glycidyl ester thereof,
12) the process of the third aspect for producing a modified polypropylene, wherein the compound represented by the general formula (3) is an alkali metal salt or halide of (meth)acrylic acid,
13) the process of the third aspect for producing a modified polypropylene, wherein the compound represented by the general formula (3) is a (meth)acrylic acid derivative containing OH, alkoxy, amino or isocyanate group,
14) the process of the fourth aspect for producing a modified polypropylene, wherein the compound represented by the general formula (4) is a styrene derivative, 15) the process of the fourth aspect for producing a modified polypropylene, wherein the compound represented by the general formula (4) is a vinyl compound or unsaturated dicarboxylic acid, 16) the process of the third or fourth aspect for producing a modified polypropylene, wherein the homogeneous metallic complex catalyst is composed of a vanadium complex and organoaluminum compound, 17) the process of the third or fourth aspect for producing a modified polypropylene, wherein the polypropylene is reacted with the compound represented by the general formula (3) or (4) after being dissolved in an organic solvent, and 18) a paint, surface modifier, primer, coating agent, ink, adhesive or solubilizer which contains the modified polypropylene of the first or second aspect.

DETAILED DESCRIPTION OF THE INVENTION

The modified polypropylene and process for producing same, both of the present invention, are described in detail for each item.

1. Base Polymer (Polypropylene)

The base polymer for the modification of polypropylene of the present invention has stereoregularity of value of racemic diad fraction [r] of 0.51 to 0.88, determined by $^{13}$C-NMR analysis.

There are three types of stereorepeating units which a stereoregular polypropylene can take; isotactic, syndiotactic and atactic.

An isotactic polypropylene has methyl group bonded to the tertially carbon atom in each of the monomer units bonded to each other in a series, wherein the methyl group is arranged on the same side of the hypothetical plane which pass through the main polymer chains. In other words, all of the methyl groups are above or below the plane. A syndiotactic polypropylene has a characteristic stereochemical structure, in which the monomer units having enantiomorphous, asymmetric carbon atoms are regularly arranged alternately and continuously in the main polymer chains. An atactic polypropylene has the monomer units having enantiomorphous, asymmetric carbon atoms randomly arranged in the main polymer chains.

The value of racemic diad fraction [r] defined for the present invention is an index of stereoregularity of polypropylene, representing its syndiotactic extent, i.e., index for representing number of the methyl groups alternately and continuously arranged around the plane.

For example, a polypropylene having a value of racemic diad fraction [r] of 1 (i.e., 100%) means it is totally syndiotactic. The value of racemic diad fraction [r] defined for the present invention can be determined by $^{13}$C-NMR measurement known in the art which gives integral of peak intensities corresponding to each stereoregular structures. This analytical procedure is known in the art.

It is necessary for the polypropylene for the present invention to have a value of racemic diad fraction [r] of 0.51 to 0.88, preferably 0.55 to 0.84, more preferably 0.60 to 0.84. A polypropylene having the value below 0.51 is insufficient in thermal stability, and that having the value above 0.88 has a decreased solubility in organic solvents.

The process for producing a polypropylene having a value of racemic diad fraction [r] of 0.51 to 0.88, determined by $^{13}$C-NMR analysis, is not limited so long as it gives such a polypropylene.

It is normally produced by polymerization of propylene in the presence of a homogeneous metallic complex catalyst in a solvent, e.g., saturated aliphatic hydrocarbon, e.g., propane, butane, pentane, hexane or heptane; saturated alicyclic hydrocarbon, e.g., cyclopropane or cyclohexane; aromatic hydrocarbon, e.g., benzene, toluene or xylene; or THF.

A homogeneous metallic complex catalyst is composed of an organometallic compound and organoaluminum compound, or a metallic complex of organic compound containing a hetero atom (e.g., oxygen or nitrogen) and transition metal. For example, these catalysts include:

(1) a catalyst composed of a vanadium complex and organoaluminum compound, (2) a catalyst composed of a metal selected from the group consisting of titanium, zirconium and hafnium having one cycloalkadienyl group or its derivative and at least one of alkoxy or alkylamino group, combined with aluminoxane, boron compound or organoaluminum compound, (3) a catalyst composed of a bi-bridged metallocene compound combined with aluminoxane, boron compound or organoaluminum compound, (4) a catalyst composed of a diimine complex with nickel, palladium or the like, and aluminoxane, (5) a catalyst composed of a phenoxy-imine complex with titanium, zirconium, hafnium or the like, combined with aluminoxane, and (6) a catalyst composed of a pyrrole-imine complex with titanium or the like, combined with aluminoxane.

The vanadium complexes useful for the above catalyst (1) composed of a vanadium complex and organoaluminum compound include those described in Makromol. Chem. 180, 57 to 64 (1979). More specifically, they include VOCl$_3$, VOCl$_4$, V(acetylacetonate)$_3$, V(2-methyl-1,3-butanedionate)$_3$, V(1,3-butanedionate)$_3$, VO(acetylacetonate)$_2$, VOCl$_2$(acetylacetonate), VOCl(acetylacetonate)$_2$ and VO(OR)$_3$. They also include vanadium compounds represented by the general formula (5) or (6), having a ligand such as alkylimide or arylimide.

The organoaluminum compounds include alkyl aluminum halides, e.g., dimethyl aluminum chloride, diethyl aluminum chloride, diethyl aluminum bromide, diethyl aluminum iodide, diisobutyl aluminum chloride, ethyl aluminum sesquichloride, ethyl aluminum dichloride and isobutyl aluminum dichloride; and aluminoxanes, e.g., methyl aluminoxane.

General formula (5)

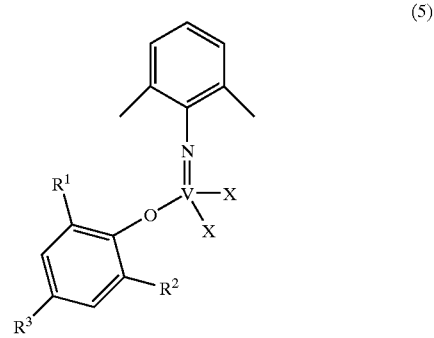

(wherein, X is F, Cl, Br or I, or an alkyl group of 1 to 3 carbon atoms; and R$^1$ to R$^3$ are each an alkyl group of 1 to 4 carbon atoms).

General formula (6)

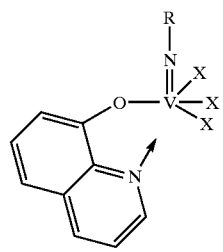

(6)

(wherein, X is F, Cl, Br or I, or an alkyl group of 1 to 3 carbon atoms; and R is alkyl group of 1 to 4 carbon atoms).

The above component is incorporated at $1\times10^{-5}$ to 0.1 mols per mol of propylene, preferably $1\times10^{-4}$ to $5\times10^{-2}$ mols in the case of a vanadium complex, and $1\times10^{-4}$ to 0.1 mols per mol of propylene, preferably $5\times10^{-3}$ to 0.05 mols in the case of an organoaluminum compound.

The reaction solvent is preferably inert to the polymerization reaction and kept liquid during the polymerization process. These solvents include saturated aliphatic hydrocarbons, e.g., propane, butane, pentane, hexane, and heptane; saturated alicyclic hydrocarbons, e.g., cyclopropane or cyclohexane; and aromatic hydrocarbons, e.g., benzene, toluene and xylene.

Moreover, the catalyst (1) may be incorporated with an electron donor. The electron donors include oxygen-containing ones, e.g., alcohols, phenols, ketones, aldehydes, carboxylic acid, malonic acid, esters of an organic or inorganic acid, monoethers, diethers and polyethers; and nitrogen-containing ones, e.g., ammonia, amines, nitriles and isocyanates. It is incorporated at 0.01 to 20 mols per mol of the vanadium complex.

The polymerization reaction is carried out at −100 to 100° C. for 0.5 to 50 hours, preferably at −80 to 50° C. for 1 to 30 hours, more preferably at −80 to −40° C. for 1 to 15 hours. Molecular weight, molecular weight distribution and yield of the product polypropylene can be adjusted by controlling reaction temperature and time. It is possible to produce a polypropylene having a molecular weight distribution close to that associated with a monodisperse system by keeping reaction temperature at −30° C. or lower.

The compounds having one cycloalkadienyl group or its derivative and at least one of alkoxy and alkylamino group, the cycloalkadienyl group containing a metal selected from the group consisting of titanium, zirconium and hafnium, for the catalyst (2) include those represented by one of the general formulae (7) to (9). Those represented by the general formula (7) include CpTi(OMe)$_3$, CpTi(OEt)$_3$, CpTi(O iPr)$_3$, CpTi(O tBu)$_3$, CpTi(OC$_6$H$_5$)$_3$, CpTi(2-Me—OC$_6$H$_4$)$_3$, CpTi(2-Et-OC$_6$H$_4$)$_3$, CpTi(2-Pr—OC$_6$H$_4$)$_3$, CpTi(2-tBu-OC$_6$H$_4$)$_3$, CpTi(2,6-(MeO)$_2$C$_6$H$_3$)$_3$, CpTi(2,6-(EtO)$_2$C$_6$H$_3$)$_3$, CpTi(2,6-(iPr—O)$_2$C$_6$H$_3$)$_3$, CpTi(2,6-(t-Bu-O)$_2$C$_6$H$_3$)$_3$, CpTi(2-Me-6-tBu-OC$_6$H$_3$)$_3$, CpTi(3-Me-6-tBu-OC$_6$H$_3$)$_3$, CpTi(OMe)$_2$Cl, CpTi(OMe)$_2$Cl, CpTi(OC$_6$H$_5$)Cl$_2$, CpTi(OC$_6$H$_5$)$_2$Cl and CpTi(OMe)(OC$_6$H$_5$)Cl. Those represented by the general formula (8) include (Me$_2$C)Cp(C$_6$H$_4$)OTiCl$_2$, ((C$_6$H$_5$)$_2$C)Cp(C$_6$H$_4$)OTiCl$_2$, (Me$_2$C)Cp(3-Me-C$_6$H$_3$)OTiCl$_2$, (Me$_2$C)Cp(5-Me-C$_6$H$_3$)OTiCl$_2$, (Me$_2$C)Cp(3-tBu-C$_6$H$_3$)OTiCl$_2$, (Me$_2$C)Cp(3,5-Me$_2$-C$_6$H$_2$)OTiCl$_2$, (Me$_2$C)Cp(3,5-tBu$_2$-C$_6$H$_2$)OTiCl$_2$, (Me$_2$C)Cp(3-Me-5-tBu-C$_6$H$_2$)OTiCl$_2$ and (Me$_2$C)Cp(3-tBu-5-Me-C$_6$H$_2$)OTiCl$_2$. Those represented by the general formula (9) include MeNSiMe$_2$(Flu)TiCl$_2$, tBuNSiMe$_2$(Flu)TiCl$_2$, C$_6$H$_5$NSiMe$_2$(Flu)TiCl$_2$, tBuNSi(C$_6$H$_5$)$_2$(Flu)TiCl$_2$, and tBuNSiMe$_2$(Flu)TiMe$_2$. Zr and Hf compounds instead of Ti are included in examples of above (7) to (9).

General formulae (7) to (9)

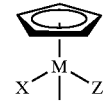

(7)

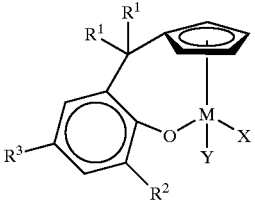

(8)

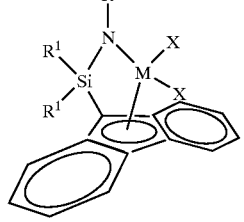

(9)

(wherein, M is a metal selected from the group consisting of Ti, Zr and Hf, X, Y and Z are each a halogen selected from the group consisting of F, Cl, Br and I, aliphatic hydrocarbon group of 1 to 8 carbon atoms, its alkoxy group, aromatic hydrocarbon group of 6 to 14 carbon atoms (which may have a substituent), or its alkoxy group; and R$^1$ to R$^3$ are each an aliphatic hydrocarbon group of 1 to 8 carbon atoms or aromatic hydrocarbon group of 6 to 14 carbon atoms (which may have a substituent), where R$^1$ to R$^3$ may be the same or different, and so are X, Y and Z).

The aluminoxanes include methyl, ethyl and isobutyl aluminoxane, and these aluminoxanes dried after being purified to remove an unreacted aluminum compound remaining therein. The aluminoxane may be replaced by a boron compound, e.g., triphenylborane, trispentafluorophenylborane or triphenylmethyltrispentafluoroborate; or organoaluminum compound, e.g., dimethyl aluminum chloride, diethyl aluminum chloride, diethyl aluminum bromide, diisobutyl aluminum chloride or dioctyl aluminum chloride.

The reaction solvent is preferably inert to the polymerization reaction and kept liquid during the polymerization process. These solvents include saturated aliphatic hydrocarbons, e.g., propane, butane, pentane, hexane and heptane; saturated alicyclic hydrocarbons, e.g., cyclopropane or cyclohexane; and aromatic hydrocarbons, e.g., benzene, toluene and xylene.

The compound having one cycloalkadienyl group or its derivative and at least one of alkoxy and alkylamino group, the cycloalkadienyl group containing a metal selected from the group consisting of titanium, zirconium and hafnium, is incorporated at $1\times10^{-8}$ to 0.1 mols per mol of propylene, preferably $1\times10^{-7}$ to $5\times10^{-2}$ mols. The aluminoxane, boron compound or organoaluminum compound is incorporated at $1\times10^{-8}$ to 0.1 mols, preferably $1\times10^{-7}$ to 0.05 mols.

The polymerization reaction is carried out at −100 to 90° C. for 0.5 to 100 hours, preferably at −50 to 50° C. for 1 to 50 hours.

The bi-bridged metallocene compounds useful for the catalyst (3), composed of a bi-bridged metallocene compound and aluminoxane, boron compound or organoaluminum compound, include those represented by the general formula (10).

These compounds include those described in J. Am. Chem. Soc., vol. 121, No. 3, 565 (1999). More specifically, they include $(1,2\text{-Me}_2\text{Si})_2(\eta^5\text{-C}_5\text{H}_3)_2\text{ZrCl}_2$, $(1,2\text{-Me}_2\text{Si})_2(\eta^5\text{-C}_5\text{H}_3)(\eta^6\text{-C}_5\text{H}_2\text{-3-CH}_3)\text{ZrCl}_2$, $(1,2\text{-Me}_2\text{Si})_2(\eta^5\text{-C}_5\text{H}_3)\{\eta^6\text{-C}_5\text{H}_2\text{-3-CH(CH}_3)_2\}\text{ZrCl}_2$, $(1,2\text{-Me}_2\text{Si})_2(\eta^5\text{-C}_5\text{H}_3)\{\eta^5\text{-C}_5\text{H-3,5-CH(CH}_3)_2\}_2\text{ZrCl}_2$, $(1,2\text{-Me}_2\text{Si})_2(\eta^5\text{-C}_5\text{H}_2\text{-4-CH}_3)\{\eta^5\text{-C}_5\text{H-3,5-CH(CH}_3)_2\}_2\text{ZrCl}_2$, $(1,2\text{-Me}_2\text{Si})_2\{(\eta^5\text{-C}_6\text{H}_5\text{-4-CH(CH}_3)_3\}\{\eta^5\text{-C}_5\text{H-3,5-(CH(CH}_3)_2)_2\}\text{ZrCl}_2$, $(1,2\text{-Me}_2\text{Si})_2\{\eta^5\text{-C}_5\text{H}_2\text{-4-Si(CH}_3)_3\}\{\eta^5\text{-C}_5\text{H-3,5-(CH(CH}_3)_2)_2\}\text{ZrCl}_2$, $(1,2\text{-(C}_6\text{H}_5)_2\text{Si})_2\{\eta^5\text{-C}_5\text{H}_2\text{-4-Si(CH}_3)_3\}\{\eta^5\text{-C}_5\text{H-3,5-(CH(CH}_3)_2)_2\}\text{ZrCl}_2$, $(1,2\text{-Me}_2\text{Si})_2\{\eta^5\text{-C}_5\text{H}_2\text{-4-Si(CH}_3)_3\}\{(\eta^5\text{-C}_5\text{H-3,5-(CH(CH}_3)_2)_2\}\text{Zr(CH}_3)_2$, $(1,2\text{-Me}_2\text{Si})_2(\eta^5\text{-C}_5\text{H}_3)_2\text{HfCl}_2$, $(1,2\text{-Me}_2\text{Si})_2(\eta^5\text{-C}_5\text{H}_3)(\eta^5\text{-C}_5\text{H}_2\text{-3-CH}_3)\text{HfCl}_2$, $(1,2\text{-Me}_2\text{Si})_2(\eta^5\text{-C}_5\text{H}_3)_2\text{TiCl}_2$ and $(1,2\text{-Me}_2\text{Si})_2(\eta^5\text{-C}_5\text{H}_3)(\eta^5\text{-C}_5\text{H}_2\text{-3-CH}_3)\text{TiCl}_2$.

General formula (10)

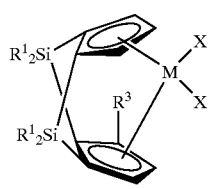

(10)

(wherein, $R^1$ to $R^3$ are each H or an aliphatic hydrocarbon group of 1 to 8 carbon atoms, which may be the same or different; X is a halogen, aliphatic hydrocarbon group of 1 to 8 carbon atoms or aromatic hydrocarbon group of 6 to 10 carbon atoms; and M is a metal selected from the group consisting of Ti, Zr and Hf).

The aluminoxane, and boron compound and organoaluminum compound may be the same as the corresponding one for the catalyst (2).

The above compound is incorporated at $5.0\times10^{-7}$ to $5.0\times10^{-3}$ mols per mol of propylene, preferably $1.0\times10^{-6}$ to $1.0\times10^{-4}$ mols in the case of the bi-bridged metallocene compound, and $1.0\times10^{-5}$ to 5.0 mols, preferably $1.0\times10^{-3}$ to 0.1 mols.

The reaction solvent is preferably inert to the polymerization reaction and kept liquid during the polymerization process. These solvents include saturated aliphatic hydrocarbons, e.g., propane, butane, pentane, hexane and heptane; saturated alicyclic hydrocarbons, e.g., cyclopropane or cyclohexane; and aromatic hydrocarbons, e.g., benzene, toluene and xylene.

The polymerization reaction is carried out at −100 to 90° C. for 0.1 to 100 hours, preferably at −60 to 50° C. for 1 to 50 hours.

The diimine complexes with nickel, palladium or the like useful for the catalyst (4), composed of a diimine complex with nickel, palladium or the like, and aluminoxane, include those represented by one of the general formulae (11) to (14).

The aluminoxanes useful for the catalyst (4) include methyl, ethyl and butyl aluminoxane. General formula (11) to (14)

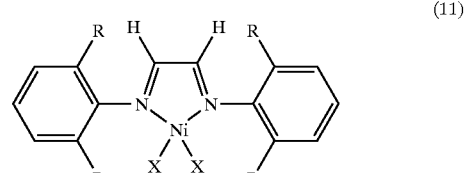

(11)

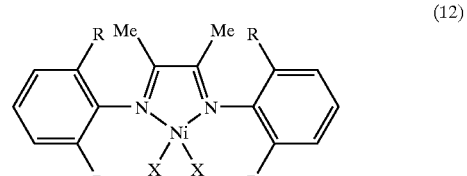

(12)

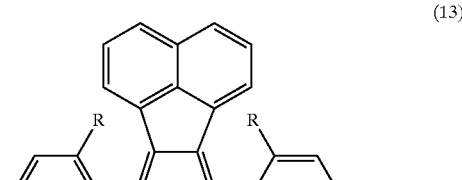

(13)

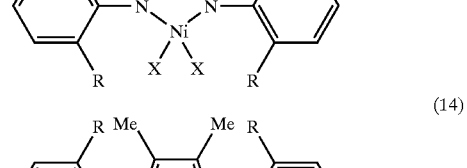

(14)

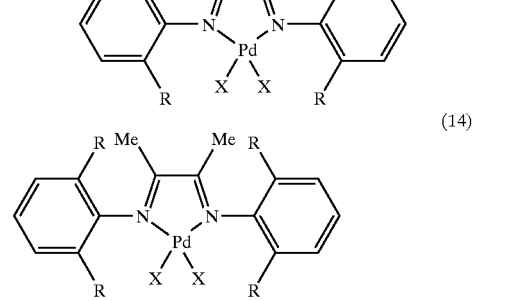

(14)

(wherein, X is Cl or methyl (Me) group; and R is methyl (Me) or isopropyl (iPr) group, where Rs may be the same or different).

The reaction solvent is preferably inert to the polymerization reaction and kept liquid during the polymerization process. These solvents include saturated aliphatic hydrocarbons, e.g., propane, butane, pentane, hexane and heptane; saturated alicyclic hydrocarbons, e.g., cyclopropane or cyclohexane; and aromatic hydrocarbons, e.g., benzene, toluene and xylene.

The diimine complex, e.g., that with nickel or palladium is incorporated at $1\times10^{-6}$ to 0.1 mols per mol of propylene, preferably $5\times10^{-6}$ to $5\times10^{-2}$ mols. The aluminoxane is incorporated at $1\times10^{-6}$ to 0.1 mols, preferably $5\times10^{-4}$ to 0.05 mols.

The polymerization reaction is carried out at −100 to 90° C. for 0.5 to 100 hours, preferably at −50 to 50° C. for 1 to 50 hours.

The phenoxy-imine complexes with titanium, zirconium, hafnium or the like useful for the catalyst (5), composed of a phenoxy-imine complex with titanium, zirconium, hafnium or the like, and aluminoxane, include those represented by the general formula (15).

The aluminoxanes useful for the catalyst (5) include methyl, ethyl and butyl aluminoxane.

General formula (15)

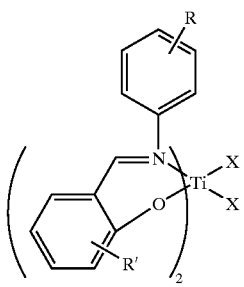

(wherein, R and R' are each an alkyl group of 1 to 5 carbon atoms; and X is F, Cl, Br or I).

The reaction solvent is preferably inert to the polymerization reaction and kept liquid during the polymerization process. These solvents include saturated aliphatic hydrocarbons, e.g., propane, butane, pentane, hexane and heptane; saturated alicyclic hydrocarbons, e.g., cyclopropane or cyclohexane; and aromatic hydrocarbons, e.g., benzene, toluene and xylene.

The phenoxy-imine complex with titanium, zirconium, hafnium or the like is incorporated at $1 \times 10^{-6}$ to 0.1 mols per mol of propylene, preferably $5 \times 10^{-6}$ to $5 \times 10^{-2}$ mols. The aluminoxane is incorporated at $1 \times 10^{-6}$ to 0.1 mols, preferably $5 \times 10^{-4}$ to 0.05 mols.

The polymerization reaction is carried out at 0 to 200° C. for 0.5 to 100 hours, preferably at 50 to 150° C. for 1 to 50 hours.

The pyrrole-imine complexes with titanium or the like useful for the catalyst (6), composed of a pyrrole-imine complexes with titanium or the like, and aluminoxane, include those represented by the general formula (16).

The aluminoxanes useful for the catalyst (6) include methyl, ethyl and butyl aluminoxane.

General formula (16)

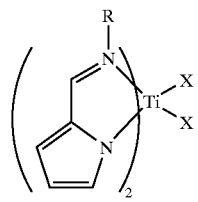

(wherein, X is a halogen atom of F, Cl, Br or I; and R is an alkyl group of 1 to 5 carbon atoms or phenyl group).

The reaction solvent is preferably inert to the polymerization reaction and kept liquid during the polymerization process. These solvents include saturated aliphatic hydrocarbons, e.g., propane, butane, pentane, hexane and heptane; saturated alicyclic hydrocarbons, e.g., cyclopropane or cyclohexane; and aromatic hydrocarbons, e.g., benzene, toluene and xylene.

The pyrrole-imine complexes with titanium or the like is incorporated at $1 \times 10^{-6}$ to 0.1 mols per mol of propylene, preferably $5 \times 10^{-6}$ to $5 \times 10^{-2}$ mols. The aluminoxane is incorporated at $1 \times 10^{-6}$ to 0.1 mols, preferably $5 \times 10^{-4}$ to 0.05 mols.

The polymerization reaction is carried out at 0 to 200° C. for 0.5 to 100 hours, preferably at 50 to 150° C. for 1 to 50 hours.

The polypropylene for the present invention is produced in the presence of one of the catalysts (1) to (6) described above, preferably one of the catalysts (1) to (3), more preferably the catalyst (1). When one of the catalysts (1) to (6) is used, hydrogen, diethylzinc or a compound containing the Si—H bond may be incorporated to control the molecular weight. Moreover, the catalysts (1) to (6) may be supported by a carrier, e.g., silica, alumina, zirconia or titania.

The polypropylene for the present invention may be incorporated with its copolymer of ethylene, α-olefin or diolefin at below 10% by mol, so long as the mixture has a value of racemic diad fraction [r] of 0.51 to 0.88, determined by $^{13}$C-NMR analysis. The α-olefins include olefins of 4 to 8 carbon atoms, e.g., 1-butene and 1-hexene, 4-methyl-1-pentene; and the diolefins include those of 4 to 14 carbon atoms, e.g., butadiene, 1,5-hexadiene, 1,7-octadiene and 1,9-decadiene.

A propylene/α-olefin copolymer, containing more than 10 mol % of comonomer, decreases, in the first place, affinity for a polypropylene-based material is lowered. Use of a homopolymer of propylene is desirable to have sufficient affinity for polypropylene.

The polypropylene for the present invention can be produced by the above processes. It preferably has a weight-average molecular weight (Mw) of 5,000 to 400,000, particularly preferably 10,000 to 250,000, and a molecular weight distribution (Mw/Mn) of 1.01 to 3.00, more preferably 1.1 to 2.5.

2. Modified Polypropylene

The modified polypropylene of the present invention can be produced by reacting a polypropylene having a value of racemic diad fraction [r] of 0.51 to 0.88, determined by $^{13}$C-NMR analysis, with at least one type of specific modifier in the presence of a radical initiator, wherein the polypropylene is dissolved in an organic solvent to react, or the polypropylene is reacted in a kneader.

The organic solvents useful for the present invention include saturated aliphatic hydrocarbons, e.g., propane, butane, pentane, hexane, heptane, octane, nonane, decane and dodecane; saturated alicyclic hydrocarbons, e.g., cyclopropane and cyclohexane; and aromatic hydrocarbons, e.g., benzene, toluene and xylene.

The radical initiators useful for the present invention include azo-based ones, e.g., azobisisobutyronitrile and 2,2-azobis(2,4-dimethylvaleronitrile); and peroxides, e.g., benzoyl peroxide, t-butylperoxy-2-ethylhexanoate and 2,5-dimethyl-2,5-di-t-butylperoxyhexane.

The modifiers, represented by the general formula (3) include the following (meth)acrylic acid derivatives, in addition to (meth)acrylic acid. These derivatives include the following compounds.

Alkyl esters, e.g., methyl acrylate, ethyl acrylate, n-butyl acrylate, isobutyl acrylate, t-butyl acrylate, cyclohexyl acrylate, 2-ethylhexyl acrylate, n-octyl acrylate, triphenylmethyl acrylate, methyl methacrylate, ethyl methacrylate, n-butyl methacrylate, isobutyl methacrylate, t-butyl methacrylate, cyclohexyl methacrylate, 2-ethylhexyl methacrylate, n-octyl methacrylate and triphenylmethyl methacrylate; glycidyl esters, e.g., glycidyl acrylate and glycidyl methacrylate; alkali metal salts of (meth)acrylic acid, e.g., sodium acrylate, potassium acrylate, lithium acrylate, sodium methacrylate, potassium methacrylate and lithium methacrylate; (meth)acrylic halides, e.g., acrylic chloride, acrylic bromide, α-chloro-methyl acrylate, methacrylic chloride, methacrylic bromide and α-chloro-methyl methacrylate; amino-containing (meth)acrylic acid derivatives, e.g., acrylamide, N,N-dimethylacrylamide, N,N-diisopropylacrylamide, methacrylamide, N,N- dimethylmethacrylamide, N,N-diisopropylmethacrylamide, N,N-dimethylaminoethyl acrylate and N,N-dimethylaminoethyl methacrylate; di(meth)acrylates, e.g., ethylene glycol diacrylate, diethylene glycol diacrylate, dipropylene glycol diacrylate, 1,4-butanediol diacrylate, 1,6-hexanediol diacrylate, ethylene glycol dimethacrylate, dipropylene glycol dimethacrylate, 1,4-butanediol dimethacrylate and 1,6-hexanediol dimethacrylate; OH— or alkoxy-containing (meth)acrylic acid derivatives, e.g., 2-hydroxyethyl acrylate, 3-hydroxypropyl acrylate, 4-hydroxybutyl acrylate, trimethoxysilylpropyl acrylate, 2-methoxyethyl acrylate, 2-hydroxyethyl methacrylate, 3-hydroxypropyl methacrylate, 4-hydroxybutyl methacrylate, 2-methoxyethyl methacrylate and trimethoxysilylpropyl methacrylate; isocyanate-containing (meth) acrylic acid derivatives, e.g., 2-isocyanate ethyl methacrylate and 2-isocyanate ethyl acrylate; and P-containing (meth) acrylic acid derivatives, e.g., ethylene glycol methacrylate phosphate and 2-methacryloyloxyethyl phosphorylcholine. The other P-containing (meth)acrylic acid derivatives useful for the modifier include $CH_2=C(CH_3)CO-O-CH_2-CH_2(CH_2Cl)-O-PO(OH)_2$ and $CH_2=C(CH_3)CO-O-CH_2-CH_2-O-PO(OH)-O-NH_3(CH_2CH_2OH)$.

Of the compounds represented by the general formula (3), the more preferable ones for the present invention are acrylic acid, methacrylic acid, alkyl and glycidyl ester of these acids, and OH— and alkoxy-containing (meth)acrylic acid derivatives.

Those represented by the general formula (4) include the following compounds.

Nitrile compounds, e.g., acrylonitrile and methacrylonitrile; vinyl compounds, e.g., vinyl chloride, vinyl bromide, vinyl fluoride, vinyl iodide, vinylidene chloride, sodium vinyl-sulfonate, potassium vinyl-sulfonate, lithium vinyl-sulfonate, methyl vinyl ether, ethyl vinyl ether, isobutyl vinyl ether, vinyl pyridine, N-vinyl pyridine, vinyl pyrrolidone, acrolein, methyl vinyl ketone, isobutyl vinyl ketone, vinyl acetate, vinyl propionate, vinyl butyrate, vinyl trimethylsilane, vinyl triethoxysilane, vinyl acetoamide and allyl chloride; styrene and its derivatives, e.g., styrene, hydroxystyrene, aminostyrene, divinyl benzene, vinyl benzoate, cyanostyrene, nitrostyrene, chloromethylstyrene, α-methylstyrene, p-methylstyrene, acetoxystyrene, p-dimethylaminomethylstyrene; and unsaturated dicarboxylic acids, e.g., maleic acid, citraconic acid, dimethyl maleate and diethyl maleate.

Of the compounds represented by the general formula (4), styrene derivatives are particularly preferable.

A polypropylene is modified to react with a modifier in the presence of a radical initiator such as t-butylperoxy-2-ethylhexanoate, wherein the polypropylene is dissolved in an organic solvent e.g., heptane or xylene, or the reaction is carried out in a kneader. The modification may be carried out in a nitrogen atmosphere, as required.

The modifiers in the modified polypropylene of the present invention are grafted to the main polypropylene chain. The modifier, when incorporated at 2 or more sites, is present in the main chain randomly to form a pendant structure.

For example, when one molecule of a modifier monomer is bonded to the polypropylene main chain at one site, the modified polypropylene has one bonded unit of n=1 or m=1. When the molecule of a modifier monomer are bonded at 3 sites, the modified polypropylene has 3 bonded units of n=1 or m=1. When the main polypropylene chain is modified at 10 sites with the units, e.g., at 2 sites with the units of n=1 or m=1, 3 sites with the units of n=2 or m=2 and 4 sites with the units of n=3 or m=3, the modified polypropylene has a modification number of 20 (2+6+12=20 as a total number of "n"s or "m"s.

The modified polypropylene of the present invention has a modification number of 1 to 500, preferably 1 to 400, more preferably 1 to 300.

Normally, one type of modifier is used for the present invention. However, 2 or more types of modifier may be used. When 2 or more types of modifier are used, they are selected from the compounds represented by the general formula (3) or (4). They may be reacted with the polypropylene after being mixed, or reacted in two or more stages.

The modification reaction is carried out at 50 to 200° C., preferably 60 to 160° C., for 0.5 hours or more, particularly preferably 1 to 10 hours. Increasing reaction time increases quantity of the polypropylene modifier incorporated. The modification reaction is carried out normally in one stage, but may be in 2 or more stages.

The polypropylene having a value of racemic diad fraction [r] of 0.51 to 0.88, determined by $^{13}$C-NMR analysis, can be modified by the above procedure with the units represented by the general formula (1) or (2).

The modified polypropylene, comprising the syndiotactic polypropylene having a value of racemic diad fraction [r] of 0.51 or more as the base polymer, is characterized by high thermal stability while keeping good affinity for the base polymer. At the same time, it is highly soluble in organic solvents, because of the base polymer having a value of racemic diad fraction [r] of 0.88 or less.

The modified polypropylene of the present invention can be used for a solubilizer for polypropylene with another type of polymer, paint, surface modifier, primer, ink, adhesive and coating agent, of which paint, surface modifier, primer and coating agent are particularly preferable uses.

EXAMPLES

The present invention is described in more detail by EXAMPLES, which by no means limit the present invention.

The polymer was analyzed by the following evaluation procedures in EXAMPLES and COMPARATIVE EXAMPLES (1) Measurement of Molecular Weight Molecular weight was measured by gel permeation chromatography (GPC) (analyzer: Waters' GPC Model 150) under the conditions of solvent: o-dichlorobenzene, measurement temperature: 135° C., and solvent flow rate: 1.0 mL/minute. The polystyrene calibration curve was prepared by using Tosoh's standard monodisperse polystyrene sample, and the polypropylene calibration curve was prepared based on the polystyrene curve by the universal method, to determine polypropylene molecular weight.

(2) Measurement of Stereoregularity

Stereoregularity was measured by a $^{13}$C-NMR analyzer (Varian's XL-200, equipped with a PET pulse Fourier converter) under the conditions of 50 MHz, 120° C., pulse width: 8.2 μsn/3, pulse interval: 4 seconds and integration number: 5000. The sample was prepared in the form of solution of a 2:1 mixed solvent of trichlorobenzene and benzene.

(3) Measurement of Quantity of Modifier Incorporated in Polypropylene (Number of Functional Groups/a Polypropylene Molecule)

The quantity was measured by analyzing the absorption peaks obtained by an IR analyzer (JASCO's FT/IR-470), where a film-shape polymer sample was used. This analysis gave number of the functional groups corresponding to a total number of "m"s and "n"s.

Example 1

(1) Polymerization of Propylene

A 2 L four-mouthed flask equipped with a stirrer was charged with 150 mL of toluene, 100 mL of 2 mol/L toluene solution of diethyl aluminum chloride, and then 8.3 mols of propylene, after it was sufficiently purged with nitrogen, and the mixture was cooled to −80° C. with stirring.

Next, 20 mL of 0.1 mol/L toluene solution of tris(2-methyl-1,3-butanedionate)vanadium was charged, while the content was kept at −80° C., to initiate the polymerization. The stirring was stopped, after the polymerization was allowed to proceed for 15 hours, and the reaction effluent was poured into 2 L of ethanol/hydrochloric acid solution kept at −78° C. The resulting polymer was washed with 1 L of ethanol 5 times, and dried at room temperature under a vacuum, to obtain 27 g of the polymer.

The polymer had a weight-average molecular weight (Mw) of 68,000 and weight-average molecular weight/number-average molecular weight ratio (Mw/Mn) of 1.5, determined by GPC. It also had a value of racemic diad fraction [r] of 0.79, determined by $^{13}$C-NMR analysis, as an index representing the polymer's stereoregularity.

The propylene polymerization conditions and polymer analysis results are given in Table 1.

TABLE 1

| EXAMPLE | Catalyst (mmol) | Promoter (mmol) | Electron donor (mmol/L) | Temperature (° C.) | Reaction time (h) | Yield (g) | Mw × 10$^4$ | Mw/Mn | [r] |
|---|---|---|---|---|---|---|---|---|---|
| 1 | V(mbd)$_3$/(2.0) | Al(C$_2$H$_5$)$_2$Cl/(200) | — | −80 | 15 | 27 | 6.8 | 1.5 | 0.79 |
| 2 | V(mbd)$_3$/(3.5) | Al(C$_2$H$_5$)$_2$Cl/(45) | — | −60 | 3 | 44 | 5.3 | 1.2 | 0.8 |
| 3 | V(mbd)$_3$/(3.5) | Al(C$_2$H$_5$)$_2$Cl/(60) | — | −50 | 2 | 81 | 4.4 | 1.4 | 0.78 |
| 4 | V(mbd)$_3$/(0.7) | Al(C$_2$H$_5$)$_2$Cl/(60) | Diisopropyl phthalate (12) | −60 | 8 | 46 | 13 | 1.4 | 0.8 |
| 5 | V(mbd)$_3$/(3.5) | Al(C$_2$H$_5$)$_2$Cl/(60) | Diethyl ether/(6.0) | −60 | 2 | 73 | 6.8 | 1.2 | 0.77 |
| 6 | V(mbd)$_3$/(3.5) | Al(C$_2$H$_5$)$_2$Cl/(60) | Tetrahydropyran/(7.0) | −50 | 1 | 56 | 6.9 | 1.5 | 0.77 |
| 7 | V(mbd)$_3$/(0.5) | Al(C$_2$H$_5$)$_2$Cl/(50) | — | −78 | 3 | 52 | 8.8 | 1.4 | 0.82 |
| 8 | V(mbd)$_3$/(1.0) | Al(C$_2$H$_5$)$_2$Cl/(30) | 3-Propanone/(12) | −60 | 8 | 56 | 9.9 | 1.7 | 0.81 |
| 9 | V(acac)$_3$/(5.0) | Al(C$_2$H$_5$)$_2$Cl/(250) | — | −78 | 3 | 9.4 | 2.6 | 1.1 | 0.81 |
| 10 | V(acac)$_3$/(5.0) | Al(C$_2$H$_5$)$_2$Cl/(50) | — | −65 | 10 | 24 | 14 | 1.2 | 0.8 |
| 11 | V(acac)$_3$/(5.0) | Al(C$_2$H$_5$)$_2$Cl/(50) | — | −48 | 2 | 19 | 6.2 | 1.4 | 0.8 |
| 12 | V(acac)$_3$/(5.0) | Al(C$_2$H$_5$)$_2$Cl/(50) | Methanol/(5.0) | −78 | 15 | 43 | 10 | 1.1 | 0.79 |
| 13 | V(acac)$_3$/(10) | Al(C$_2$H$_5$)$_2$Br/(50) | — | −78 | 8.5 | 5.2 | 1 | 1.2 | 0.66 |
| 14 | V(acac)$_3$/(10) | Al(i-C$_4$H$_9$)$_2$Cl/(50) | — | −78 | 15 | 19 | 14 | 1.1 | 0.7 |
| 15 | V(acac)$_3$/(1.0) | Al(C$_2$H$_5$)$_{1.5}$Cl$_{1.5}$/(30) | — | −60 | 8 | 43 | 10 | 1.7 | 0.82 |
| 16 | V(acac)$_3$/(5.0) | Al(C$_2$H$_5$)Cl$_2$/(50) | — | −78 | 8 | 9.7 | 3.7 | 2 | 0.82 |
| 17 | VCl$_4$/(2.0) | Al(C$_2$H$_5$)Cl$_2$/(20) | Anisole/(5.0) | −70 | 2 | 15 | 5.7 | 1.8 | 0.87 |
| 18 | VCl$_4$/(5.0) | Al(C$_2$H$_5$)Br$_2$/(50) | — | −60 | 15 | 8.2 | 1.3 | 2 | 0.65 |

TABLE 2

| | Catalyst (mmol) | Promoter (mmol) | Electron donor (mmol/L) | Temperature (° C.) | Reaction time (h) | Yield (g) | Mw × 10$^4$ | Mw/Mn | [r] |
|---|---|---|---|---|---|---|---|---|---|
| EXAMPLE | | | | | | | | | |
| 19 | VCl$_4$/(10.0) | Al(C$_2$H$_5$)$_{1.5}$Cl$_{1.5}$/(50) | — | −78 | 2.5 | 57 | 2.6 | 1.7 | 0.83 |
| 20 | VOCl$_3$/(0.2) | Al(C$_2$H$_5$)$_{1.5}$Cl$_{1.5}$/(5) | — | −70 | 3 | 54 | 3.8 | 2.1 | 0.84 |
| 21 | t-BuNSiMe$_2$FluTiMe$_2$/(0.002) | B(C$_6$F$_5$)$_3$/(0.004) + Al(n-C$_8$H$_{17}$)$_2$Cl/(0.04) | — | 40 | 1 | 9.6 | 8.6 | 1.6 | 0.75 |
| 22[a)] | t-BuNSiMe$_2$FluTiMe$_2$/(0.001) | Dry-MMAO/(8.0) | — | 0 | 1 | 5.7 | 19 | 1.3 | 0.79 |
| 23 | V(mbd)$_3$/(0.7) | Al(C$_2$H$_5$)$_2$Cl/(60) | Diisopropyl phthalate (12) | −60 | 8 | 46 | 13 | 1.4 | 0.80 |
| 24~37 | The same as that for EXAMPLE 23 | | | | | | | | |
| COMPARATIVE EXAMPLE | | | | | | | | | |
| 1 | Me$_2$C(CpFlu)ZrMe$_2$/(0.001) | B(C$_6$F$_5$)$_3$/(0.004) + Al(n-C$_8$H$_{17}$)$_2$Cl/(0.04) | — | 60 | 2 | 4.3 | 9.4 | 1.8 | 0.94 |
| 2[b)] | Ti catalyst supported by MgCl$_2$ | Al(C$_2$H$_5$)$_3$ | Dibutyl phthalate | 70 | 1 | 190.8 | 14.2 | 5.7 | 0.01 |

[a)]Dry-MMAO: Isobutyl aluminoxane (MMAO) obtained by directly reacting triisobutyl aluminum with water in an organic solvent, e.g., toluene. It was purified to remove an unreacted aluminum compound remaining therein, and dried.
[b)]The catalyst and promoter were prepared by the procedure described in Japanese Patent Laid-open Publication No. 63-264607 (EXAMPLE 1), and polypropylene was prepared by the polymerization procedure described also in the patent publication (APPLICATION EXAMPLE 1).

(2) Incorporation of Modifier into Polypropylene 20 g of xylene, bubbled beforehand with nitrogen, was added to 2 g of the polypropylene prepared above, and the mixture was stirred by a stirrer at room temperature until the polypropylene was completely dissolved.

Next, 1.0 g of methyl methacrylate and 0.05 g of t-butylperoxy-2-ethylhexanoate as a radical initiator were added to and mixed with the above mixture for 2 minutes. The reaction system thus prepared was heated in an oil bath, and continuously stirred for 3 hours after it reached 60° C.

Then, 50 mL of xylene kept at room temperature was added to the system, immediately after the oil bath was removed. The resulting xylene solution was poured into 600 mL of methanol to precipitate the polymer, which was taken out of the system and dissolved in 150 mL of heptane. The resulting heptane solution was transferred into a separatory funnel, to which 50 mL of methanol was added. The funnel was sufficiently shaked, and allowed to stand for phase separation. This procedure was repeated 3 times. Only the heptane layer was collected, and sufficiently dried to obtain the polymer.

The polymer had an absorption peak relevant to the ester at around 1730 cm$^{-1}$, observed by IR analysis. It was clarified that the modifier was incorporated into the polypropylene at 15/chain (i.e., "n"=15), determined from intensity of the absorption.

It also had a peak relevant to the methoxy proton in the methyl ester at around 3.5 ppm, observed by $^1$H-NMR analysis. Thus, the NMR and IR analysis results confirmed that the methyl methacrylate units were incorporated in the polypropylene chain.

The polypropylene modification conditions and quantity of the modifier incorporated into the modified polymer are given in Table 3.

TABLE 3

| EXAMPLE | Modifier/(g) | Radical reaction initiator/(g) | Solvent/(g) | Temperature (° C.) | Time (h) | Quantity of modifier incorporated[a] (mol/mol-PP) |
|---|---|---|---|---|---|---|
| 1 | Methyl methacrylate/(1.0) | t-butylperoxy-2-ethylhexanoate/(0.05) | Xylene (20) | 60 | 3.0 | 15.0 |
| 2 | Methyl methacrylate/(0.5) | t-butylperoxy-2-ethylhexanoate/(0.05) | Decane (5) | 93 | 5.0 | 4.6 |
| 3 | Methyl methacrylate/(0.1) | 2,5-Dimethyl-2,5-di-t-butylperoxy-hexane/(0.01) | Xylene (20) | 136 | 2.0 | 1.0 |
| 4 | Acrylonitrile/(0.1) | t-butylperoxy-2-ethylhexanoate/(0.05) | Hexane (10) | 60 | 3.0 | 1.7 |
| 5 | Acrylamide/(0.2) | t-butylperoxy-2-ethylhexanoate/(0.05) | Toluene (10) | 93 | 4.0 | 2.6 |
| 6 | Cyclohexyl acrylate/(0.5) | Azobisisobutylonitrile/(0.05) | Hexane (20) | 60 | 5.0 | 8.6 |
| 7 | Hexanediol diacrylate/(0.2) | t-butylperoxy-2-ethylhexanoate/(0.05) | Xylene (20) | 93 | 4.0 | 1.5 |
| 8 | Hexanediol diacrylate/(0.5) | 2,5-Dimethyl-2,5-di-t-butylperoxy-hexane/(0.05) | Dodecane (20) | 196 | 4.0 | 1 |
| 9 | Hexanediol diacrylate/(0.8) | 2,5-Dimethyl-2,5-di-t-butylperoxy-hexane/(0.05) | Decane (5) | 138 | 5.0 | 1.9 |
| 10 | Polyethylene glycol diacrylate/(1.0) | 2.5-Dimethyl-2,5-di-t-butylperoxy-hexane/(0.05) | Decane (10) | 138 | 10 | 1.5 |
| 11 | Dimethylaminoethyl acrylate/(1.0) | t-butylperoxy-2-ethylhexanoate/(0.05) | Decane (20) | 60 | 4.0 | 1.2 |
| 12 | Polypropylene glycol diacrylate/(1.0) | t-butylperoxy-2-ethylhexanoate/(0.05) | Heptane (20) | 93 | 3.0 | 1.1 |
| 13 | 2-isocyanateethyl methacrylate/(0.5) | t-butylperoxy-2-ethylhexanoate/(0.05) | Octane (20) | 93 | 10 | 1.3 |
| 14 | Isobutyl methacrylate/(0.5) | t-butylperoxy-2-ethylhexanoate/(0.05) | Heptane (20) | 93 | 4.0 | 12 |
| 15 | Isobutyl methacrylate/(0.4) | t-butylperoxy-2-ethylhexanoate/(0.05) | Xylene (20) | 93 | 4.0 | 6.7 |

[a]Quantity of the modifier incorporated per a molecule of polypropylene (totaled number of "m"s and "n"s for the modifier incorporated per a molecule of polypropylene)

TABLE 4

| EXAMPLE | Modifier/(g) | Radical reaction initiator/(g) | Solvent/(g) | Temperature (° C.) | Time (h) | Quantity of modifier incorporated (mol/mol-PP) |
|---|---|---|---|---|---|---|
| 16 | Isobutyl methacrylate/(0.5) | Azobisisobutylonitrile/(0.05) | Hexane (20) | 60 | 5.0 | 2.6 |
| 17 | p-acetoxystyrene/(0.5) | 2,5-Dimethyl-2,5-di-t-butylperoxy-hexane/(0.05) | Decane (20) | 138 | 5.0 | 1.7 |
| 18 | p-methylstyrene/(1.0) | Azobisisobutylonitrile/(0.05) | Hexane (20) | 60 | 8.0 | 3.2 |
| 19 | p-methylaminomethylstyrene/(0.5) | Azobisisobutylonitrile/(0.05) | Octane (20) | 60 | 5.0 | 1.5 |
| 20 | Vinyl pyridine/(0.8) | t-butylperoxy-2-ethylhexanoate/(0.05) | Toluene (10) | 93 | 4.0 | 1.3 |
| 21 | Vinyl pyrrolidone/(0.5) | t-butylperoxy-2-ethylhexanoate/(0.05) | Heptane (20) | 93 | 5.0 | 1.1 |
| 22 | Vinyl acetate/(0.5) | t-butylperoxy-2-ethylhexanoate/(0.05) | Heptane (10) | 60 | 5.0 | 1.0 |
| 23[b] | Isobutyl methacrylate/(1.5) | t-butylperoxy-2-ethylhexanoate/(0.06 in total) | Decane (5) | 81 | 9 in total | 39 |
| 24[c] | Isobutyl methacrylate/(1.5 in total) | t-butylperoxy-2-ethylhexanoate/(0.05) → 2,5-Dimethyl-2,5-di-t-butylperoxy-hexane/(0.05) | Xylene (20) | 81→138 | 4.0→4.0 | 53 |
| 25 | Acrylic acid/(1.0) | t-butylperoxy-2-ethylhexanoate/(0.06 in total) | Toluene (10) | 93 | 4.0 | 5.1 |
| 26 | Methacrylic acid/(1.0) | Azobisisobutylonitrile/(0.05) | Octane (20) | 60 | 4.0 | 1.4 |
| 27 | Butanediol diacrylate/(0.4) | t-butylperoxy-2-ethylhexanoate/(0.05) | Decane (20) | 60 | 3.0 | 8.1 |
| 28 | Ethylene glycol dimethacrylate/(2.0) | t-butylperoxy-2-ethylhexanoate/(0.2) | Octane (20) | 93 | 4.0 | 22 |

[b]The reaction was allowed to proceed in the presence of 0.02 g of t-butylperoxy-2-ethylhexanoate as a radical reaction initiator for 3 hours, and this procedure was repeated 3 times.
[c]The reaction between 0.5 g of isobutyl methacrylate and 0.05 g of t-butylperoxy-2-ethylhexanoate was allowed to proceed at 81° C., and then 1.0 g of glycidyl methacrylate and 1.0 g of isobutyl methacrylate and 0.05 g of 2,5-dimethyl-2,5-di-t-butylperoxyhexane were added to the system to continue the reactions at 138° C. Quantity of the modifier incorporated is the totaled quantity of the 2 modifiers.

TABLE 5

| | Modifier/(g) | Radical reaction initiator/(g) | Solvent/(g) | Temperature (° C.) | Time (h) | Quantity of modifier incorporated (mol/mol-PP) |
|---|---|---|---|---|---|---|
| EXAMPLE | | | | | | |
| 29 | Glycidyl methacrylate/(2.0) | t-butylperoxy-2-ethylhexanoate/(0.2) | Xylene (20) | 93 | 2.0 | 3.3 |
| 30 | Hydroxyethyl methacrylate/(0.8) | t-butylperoxy-2-ethylhexanoate/(0.2) | Decane (10) | 93 | 4.0 | 7.2 |
| 31[d] | Butanediol diacrylate/(0.5)→ Glycidyl methacrylate/(1.0) | t-butylperoxy-2-ethylhexanoate/(0.05)→ 2,5-Dimethyl-2,5-di-t-butylperoxy-hexane/(0.05) | Decane (20) | 93→138 | 2.0→ 3.0 | 12 |
| 32[a] | Hydroxyethyl methacrylate/(1.5) + Butanediol diacrylate/(1.0) | 2,5-Dimethyl-2,5-di-t-butylperoxy-hexane/(0.05) | Decane (20) | 138 | 4.0 | 23 |
| 33[f] | Acrylic acid/(0.5) + Maleic acid/(1.5) | 2,5-Dimethyl-2,5-di-t-butylperoxy-hexane/(0.05) | Decane (20) | 138 | 6.0 | 4.2 |
| 34 | Maleic acid/(1.0) | t-butylperoxy-2-ethylhexanoate/(0.05) | Decane (20) | 93 | 3.0 | 2.6 |
| 35 | N-butyl acrylate/(2.0) | t-butylperoxy-2-ethylhexanoate/(0.1) | Decane (25) | 106 | 4.0 | 252 |
| 36 | N-butyl acrylate/(1.0) | t-butylperoxy-2-ethylhexanoate/(0.08) | Xylene (30) | 106 | 2.0 | 121 |
| 37 | Ethylene glycol methacrylate phosphate/(0.2) | t-butylperoxy-2-ethylhexanoate/(0.05) | Decane (20) | 106 | 2.0 | 3.5 |
| COMPARATIVE EXAMPLE | | | | | | |
| 1 | Methyl methacrylate/(1.0) | t-butylperoxy-2-ethylhexanoate/(0.05) | Xylene (20) | 60 | 3.0 | ~0 |
| 2 | Methyl methacrylate/(1.0) | t-butylperoxy-2-ethylhexanoate/(0.05) | Toluene (15) | 93 | 5.0 | ~0 |

[d]The reaction between 0.5 g of butanediol diacrylate and 0.05 g of t-butylperoxy-2-ethylhexanoate was allowed to proceed at 93° C. for 2 hours, and then 1.0 g of glycidyl methacrylate and 0.05 g of 2,5-dimethyl-2,5-di-t-butylperoxyhexane were added to the system to continue the reactions at 138° C. for 3 hours. Quantity of the modifier incorporated is the totaled quantity of the 2 modifiers.
[e]The reactions among 1.5 g of hydroxyl methacrylate. 1.0 g of butanediol diacrylate and 0.05 g of 2,5-dimethyl-2,5-di-t-butylperoxyhexane were allowed to proceed at 138° C. for 4 hours. Quantity of the modifier incorporated is the totaled quantity of the 2 modifiers.
[f]The reactions among 0.5 g of acrylic acid, 1.5 g of maleic acid and 0.05 g of 2,5-dimethyl-2,5-di-t-butylperoxyhexane, which was added to the mixture of these acids, were allowed to proceed at 138° C. for 6 hours. Quantity of the modifier incorporated is the totaled quantity of the 2 modifiers.

(3) Evaluation of Modified Polypropylene

Each of the polypropylenes modified with methyl methacrylate was measured for its solubility in organic solvents and affinity for polypropylene by the following procedures.

(3-1) Solubility in Organic Solvents

A 50 mL of Erlenmeyer flask was charged with 20 mL of toluene and 1 g of the polymer prepared in EXAMPLE 1, and the mixture was stirred at room temperature for 5 hours. The polymer was completely dissolved, indicating that the modified polypropylene of the present invention is highly soluble in the organic solvent.

(3-2) Affinity for Polypropylene

A toluene solution of the polymer prepared in EXAMPLE 1 was spread on a polypropylene plate at room temperature, and dried at 100° C. for 1 hour. Tapes were adhered to the coated plate in a checker pattern in accordance with JIS K-5400. No polymer coated on plate was separated, indicating that the modified polypropylene of the present invention is well adhesive to and affinitive for polypropylene.

Examples 2 to 37

Propylene was polymerized in each of EXAMPLES 2 to 37 in a manner similar to that for EXAMPLE 1 under the conditions given in Table 1 or 2, and the resulting polypropylene was modified under the conditions given in Table 3, 4 or 5.

In EXAMPLE 23, the modification reaction was carried out in the presence of 0.02 g of t-butylperoxy-2-ethylhexanoate as a radical initiator for 3 hours, and this procedure was repeated 4 times.

In EXAMPLE 24, on the other hand, the reaction between 0.5 g of isobutyl methacrylate and 0.05 g of t-butylperoxy-2-ethylhexanoate was allowed to proceed at 81° C., and then 1.0 g of isobutyl methacrylate and 0.05 g of 2,5-dimethyl-2,5-di-t-butylperoxyhexane were added to the system to continue the reaction at 138° C. Quantity of the modifier incorporated is the totaled quantity of the two kinds of it.

In EXAMPLE 31, the reaction between 0.5 g of butanediol diacrylate and 0.05 g of t-butylperoxy-2-ethylhexanoate was allowed to proceed at 93° C. for 2 hours, and then 1.0 g of glycidyl methacrylate and 0.05 g of 2,5-dimethyl-2,5-di-t-butylperoxyhexane were added to the system to continue the reaction at 138° C. for 3 hours. Quantity of the modifier incorporated is the totaled quantity of the two kinds of it.

In EXAMPLE 32, the reactions among 1.5 g of hydroxyl methacrylate, 1.0 g of butanediol diacrylate and 0.05 g of 2,5-dimethyl-2,5-di-t-butylperoxyhexane were allowed to proceed at 138° C. for 4 hours. Quantity of the modifier incorporated is the totaled quantity of the two kinds of it.

In EXAMPLE 33, the reactions among 0.5 g of acrylic acid, 1.5 g of maleic acid and 0.05 g of 2,5-dimethyl-2,5-di-t-butylperoxyhexane, which was added to the mixture of these acids, were allowed to proceed at 138° C. for 6 hours. Quantity of the modifier incorporated is the totaled quantity of the two kinds of it.

The propylene polymerization conditions, and the analysis results of the resulting polymers are given in Tables 1 and 2. The conditions under which a variety of modifiers were incorporated into the polypropylenes, and the analysis results of the resulting modified polymers are given in Tables 3 to 5.

Solubility of the modified polymer prepared in each of EXAMPLES 2 to 37 in organic solvents was evaluated in the same manner as in EXAMPLE 1. Each of the polymers was completely dissolved, indicating that the modified polypropylene of the present invention is highly soluble in the organic solvent.

Affinity for polypropylene was also evaluated for each of the modified polymers in the same manner as in EXAMPLE 1. No polymer coated on plate was separated, indicating that each of the modified polypropylenes of the present invention is well adhesive to and affinitive for polypropylene.

All of the base polymers used in EXAMPLES had a racemic pentad value [rrrr] of below 0.50.

Comparative Examples 1 and 2

In COMPARATIVE EXAMPLE 1, propylene was polymerized under the conditions given in Table 2 in the same manner as in EXAMPLE 1, except that the polypropylene polymerization catalyst was replaced by a comparative one. An attempt was made to react the resulting polypropylene with methyl acrylate, although it was sparingly soluble in heptane, under the conditions given in Table 5.

In COMPARATIVE EXAMPLE 2, propylene was polymerized in the presence of a catalyst prepared in accordance with teaching of Japanese Patent Laid Open Publication No.63-264607 (EXAMPLE 1) in the same manner as in APPLICATION EXAMPLE 1 described in the above patent publication, except that 1500 mL of hydrogen was charged. An attempt was made to modify the resulting polypropylene under the conditions given in Table 5.

The propylene polymerization conditions, and the analysis results of the resulting polymers are given in Table 2. The conditions under which the modifiers were incorporated into the polypropylenes, and the analysis results of the resulting modified polymers are given in Table 5.

The polymers prepared in COMPARATIVE EXAMPLES 1 and 2 were evaluated in the same manner as in EXAMPLES. They are found to be insoluble in the solvent, and notably less adhesive than those of the present invention prepared in EXAMPLES.

As clearly indicated in Tables 1 to 5, the polymers prepared in EXAMPLES had a value of racemic diad fraction [r] of 0.51 to 0.88, weight-average molecular weight (Mw) of 5,000 to 400,000 and weight-average molecular weight/number-average molecular weight ratio (Mw/Mn) of 1.01 to 3.0, and was incorporated with a modifier at 1.0 to 252 functional groups/a polypropylene molecule. Each of the modified polymers prepared in EXAMPLES 1 to 37 is highly affinitive for polypropylene-based materials, and also highly soluble in the organic solvent.

On the other hand, the polymer prepared in COMPARATIVE EXAMPLE 1 had a value of racemic diad fraction [r] of 0.94, although having a weight-average molecular weight (Mw) of 94,000 and weight-average molecular weight/number-average molecular weight ratio (Mw/Mn) of 1.8, and was not modified essentially in the least, since quantity of modifier incorporated was almost 0 functional group/a polypropylene molecule.

The polymer prepared in COMPARATIVE EXAMPLE 2 had a value of racemic diad fraction [r] of 0.01, and was not modified essentially in the least, as was the case with the one prepared in COMPARATIVE EXAMPLE 1, since quantity of modifier incorporated was almost 0 functional group/a polypropylene molecule.

The polymers prepared in COMPARATIVE EXAMPLES 1 and 2 had a low solubility in the organic solvent, and were not well-balanced between thermal stability and affinity for propylene-based materials.

The modified polypropylene of the present invention is based on a polypropylene having a value of racemic diad fraction [r] of 0.51 to 0.88, determined by $^{13}$C-NMR analysis, and incorporated with a chemically bonded modifier at a specific number of functional groups per a polypropylene molecule, and as such exhibits an excellent effect of being well-balanced among the properties of high solubility in organic solvents, affinity for polypropylene-based materials and thermal stability.

Therefore, the modified polypropylene of the present invention can be suitably used for a paint, surface modifier, primer and coating agent, because it is easy for coating, adhesion and printing, and highly soluble in organic solvents, and hence is of high industrial applicability.

What is claimed is:

1. A modified polypropylene which is a polypropylene having a value of racemic diad fraction [r] of 0.51 to 0.88, determined by $^{13}$C-NMR analysis, and weight-average molecular weight (Mw) of 5,000 to 400,000, and grafted with units represented by the general formula (1):

General formula (1)

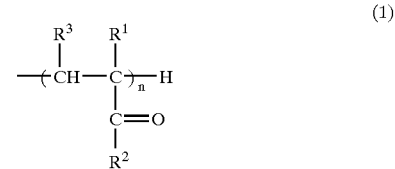

(wherein, $R^1$ is H or an alkyl group of 1 to 10 carbon atoms; $R^2$ is $OR^4$, or a halogen selected from the group consisting of Cl, Br, F and I, or $N(R^1)_2$ or $R^5$—$N(R^1)_2$ group; $R^3$ is H or —$COR^2$ group;

$R^4$ is H or an alkyl group of 1 to 10 carbon atoms, which can have a halogen; aromatic group, which can have an alkyl substituent; —$(CH_2)_a$—O—P(O)$(OR^1)_2$ or —$(CH_2)_a$—O—P(O)$(O^-)$(O—$(CH_2)_b$—$N^+R^1_3$) ("a" and "b" are each an integer of 1 to 5); alkali metal M selected from the group consisting of Li, Na and K; alicyclic hydrocarbon of 5 to 10 carbon atoms; glycidyl group; $R^5$—COCR$^1$=CH$_2$; $R^5OR^1$; $R^5Si(OR^1)_3$ or $R^5$—NCO; $R^5$ is an alkylene group of 1 to 10 carbon atoms or —[(CH$_2$)q-O-]r-("q" and "r" are each an integer of 1 to 5); and "n" is 1 to 500, wherein totaled number is 2 to 500, when there are 2 or more units represented by the general formula (1) in one polypropylene molecule).

2. A modified polypropylene which is a polypropylene having a value of racemic diad fraction [r] of 0.51 to 0.88, determined by $^{13}$C-NMR analysis, and weight-average molecular weight (Mw) of 5,000 to 400,000, and grafted with units represented by the general formula (2):

General Formula (2)

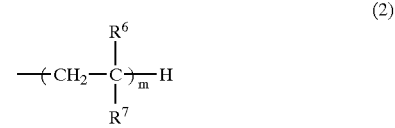

(wherein, $R^6$ is H, an alkyl group of 1 to 10 carbon atoms or halogen selected from the group consisting of Cl, Br, F and I; $R^7$ is Ar—X', OCO—$R^6$, CHO, COR$^6$, CN, pyridyl group, pyrrolidonyl group, Si$(OR^1)_3$, a halogenated alkyl of 1 to 10 carbon atoms, halogen, OR$^6$, OSO$_3$M or NH—CO—R$^6$;

X' is R$^6$, OH, COOH, NH$_2$, CN, NO$_2$, a halogenated alkyl of 1 to 10 carbon atoms, CH=CH$_2$ or OCO—R$^6$; R$^1$ is H or an alkyl group of 1 to 10 carbon atoms; M is the alkali metal described above; and "m" is 1 to 500, wherein totaled number is 2 to 500, when there are 2 or more units represented by the general formula (2) in one polypropylene molecule).

3. A process for producing a modified polypropylene, wherein the polypropylene for claim 1, produced by polymerization in the presence of a homogeneous metallic complex catalyst to have a value of racemic diad fraction [r] of 0.51 to 0.88, determined by $^{13}$C-NMR analysis, and weight-average molecular weight (Mw) of 5,000 to 400,000; is reacted with at least one type of the compound represented by the general formula (3) in the presence of a radical initiator:

General Formula (3)

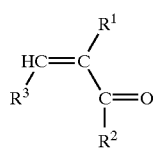

(3)

(wherein, $R^1$, $R^2$ and $R^3$ are the same as the corresponding ones described above).

4. A process for producing a modified polypropylene, wherein the polypropylene for claim 2, produced by polymerization in the presence of a homogeneous metallic complex catalyst to have a value of racemic diad fraction [r] of 0.51 to 0.88, determined by $^{13}$C-NMR analysis, and weight-average molecular weight (Mw) of 5,000 to 400,000, is reacted with at least one type of the compound represented by the general formula (4) in the presence of a radical initiator:

General Formula (4)

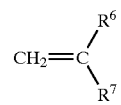

(4)

(wherein, $R^6$ and $R^7$ are the same as the corresponding ones described above).

* * * * *